Dec. 20, 1966  J. W. POWISCHILL  3,292,272
APPARATUS FOR TREATING FLUENT SOLID MATERIALS
WITH FLUIDIZING GASES
Filed Sept. 30, 1964  2 Sheets-Sheet 1
FIG.I.
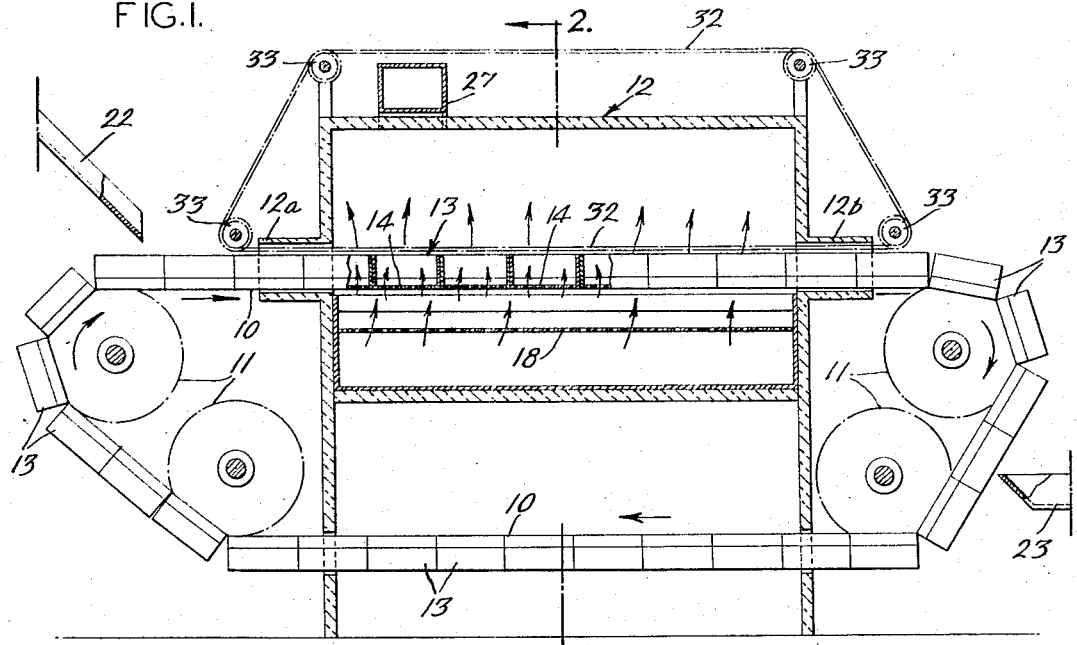
FIG.2.
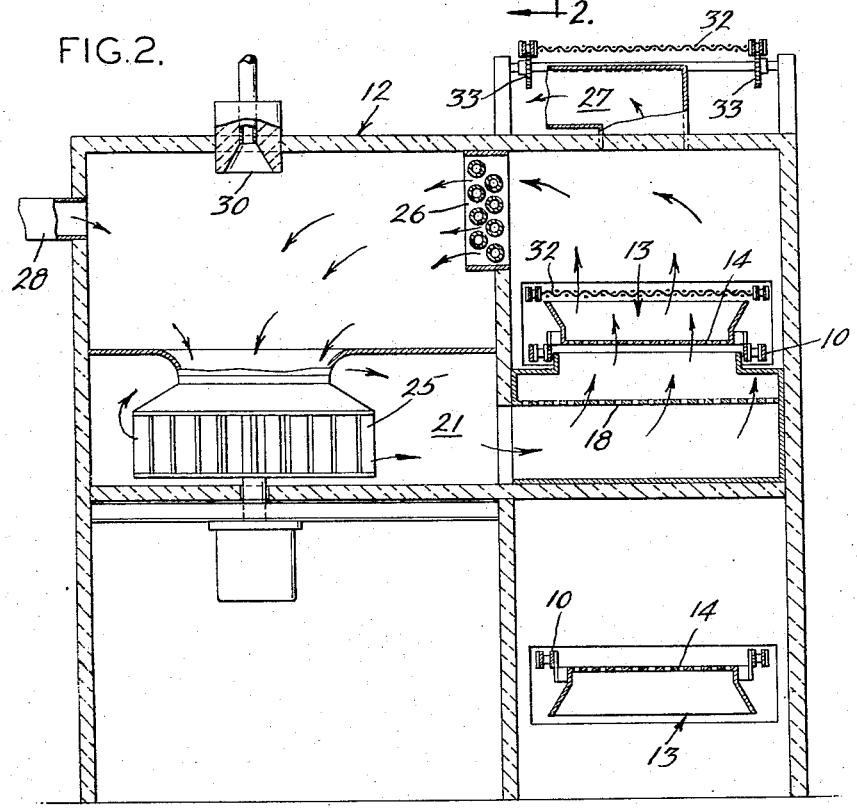
INVENTOR:
JOHN W. POWISCHILL
BY
Howson & Howson
ATTYS

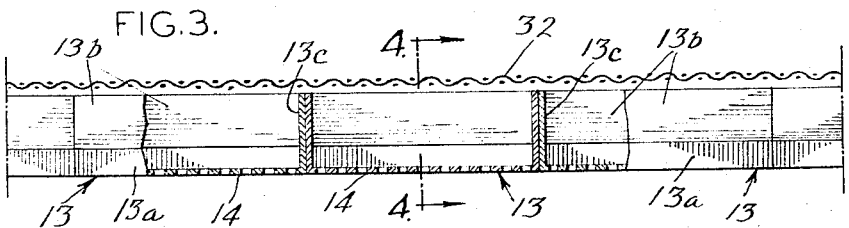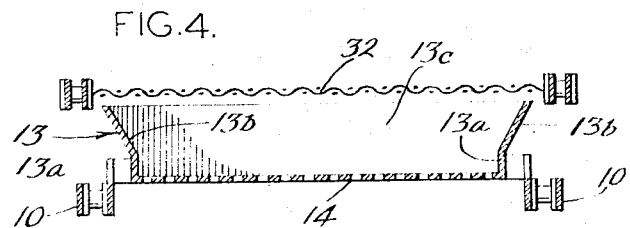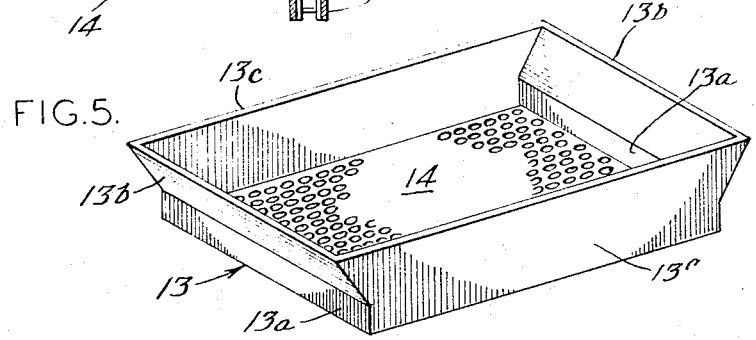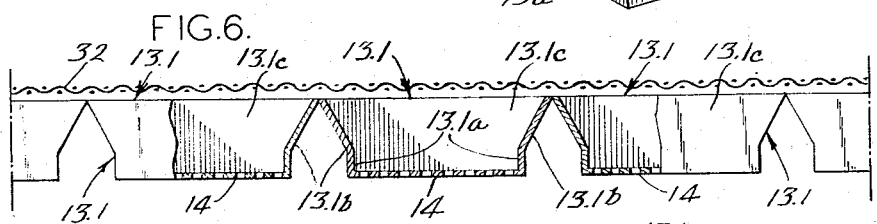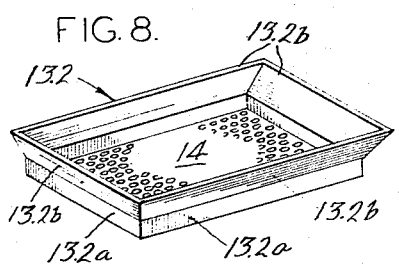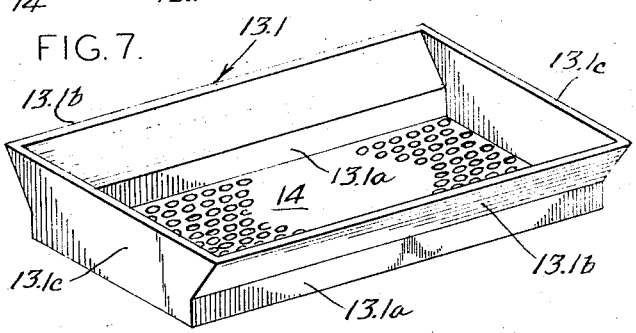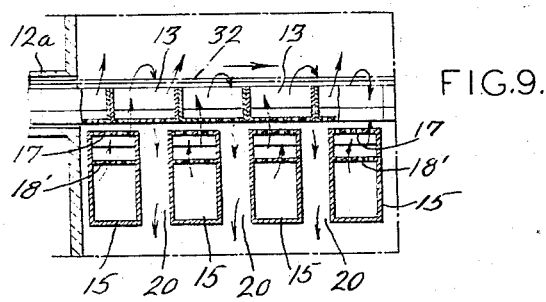

United States Patent Office 3,292,272
Patented Dec. 20, 1966

3,292,272
APPARATUS FOR TREATING FLUENT SOLID
MATERIALS WITH FLUIDIZING GASES
John W. Powischill, Cheltenham, Pa., assignor to Proctor & Schwartz, Inc., Philadelphia, Pa., a corporation of Pennsylvania
Filed Sept. 30, 1964, Ser. No. 400,387
8 Claims. (Cl. 34—57)

This invention relates to apparatus for treating fluent solid materials with fluidizing gases and has for an object the provision of improvements in this art.

This invention is an improvement upon the invention disclosed in the copending application of Albert G. Blank and John F. Scott, Serial No. 351,810, filed March 13, 1964, assigned to the same assignee as the present application.

In the copending application referred to, a plurality of compartments, in the specific form of traveling boxes or baskets, have perforate bottoms and flaring sides which cause material to be thrown up with more force at the bottom just above the perforate bottom and to be sustained with less velocity at increasing distances above the perforate bottom so that it tends to drop back out of the upflowing fluid stream, thus avoiding outflow of the suspended material with the outflowing gases.

According to the present invention a uniform high velocity is maintained for a considerable distance above the perforate bottom to lift the material further above the bottom or to move the heavier material above the bottom, after which the velocity is decreased to cause the material to tend to separate out of the gas stream before the fluidizing gas escapes. To accomplish this, the travelling boxes or baskets forming the separate compartments are made with straight parallel sides for a considerable distance above the perforate bottom and are flared outwardly above the straight parallel part.

As an aid in preventing the escape of fluent particulate solid material with the gaseous fluid there may be provided a thin flexible perforate screen which fits closely over the tops of the travelling baskets or boxes. In this way all of the material is made to travel the same distance and receive the same treatment, the separate travelling compartments formed by the baskets or boxes preventing the mixing of material at different stages of treatment; and the shape of the travelling compartments assuring that all portions of the material will by fully raised and turned in the gaseous fluid without allowing portions of the material to lie on the perforated bottom.

The apparatus is especially adapted for treating materials such as cereals, chemicals, tobacco and other fluent particulate materials. It is adapted to be used for drying, curing, toasting, puffing, conditioning, or for treatment involving chemical or physical reactions on a product. The treatment provided by the apparatus is adapted to improve the product, especially as to uniformity of condition, and to speed up the production rate by simple and relatively inexpensive equipment.

The compartments may be formed by dividing partitions above a perforate screen conveyor or the compartments may be formed as complete baskets or boxes each having its own perforate bottom. The baskets may be secured to a conveyor or may be placed on the conveyor at the intake end and removed from the outlet end of the treating chamber. The conditioned fluidizing gaseous medium may be all up-flow for the full length of the treating chamber or may be up-down flow in successive localized zones along the path of travel, the upflowing gaseous medium in all cases being a conditioned gaseous medium and not one which has made other upward passes without being reconditioned.

The velocity of the upflowing gas is made suitable for the material and its condition, which may require different velocities at different places along the length of the treating chamber or for different units when there are more than one unit. For example, the velocity may decrease proportionally along the length as the material becomes lighter.

In order to provide a better understanding of the invention, its objects, features of novelty, and advantages, certain exemplary embodiments will be described herein, reference being made to the accompanying drawings, wherein:

FIG. 1 is a diagrammatic vertical longitudinal section of one form of apparatus embodying the invention;

FIG. 2 is an enlarged transverse section taken on the line 2—2 of FIG. 1;

FIG. 3 is an enlarged section of parts shown in FIG. 1;

FIG. 4 is a vertical transverse section taken on the line 4—4 of FIG. 3;

FIG. 5 is a perspective view of one of the baskets shown in FIGS. 3 and 4;

FIG. 6 is a section like FIG. 3 but showing a different form of basket;

FIG. 7 is a perspective view of one of the baskets shown in FIG. 6;

FIG. 8 is a perspective view to smaller scale of another form of basket;

FIG. 9 is a partial view like FIG. 1 to a smaller scale, showing a different gas flow arrangement.

As shown in FIGS. 1 and 2, illustrating an all updraft arrangement, an endless conveyor belt 10 is carried by supporting wheels 11 and driven by any suitable motive means to travel through a heat insulated treating chamber 12. A plurality of compartment forming baskets or boxes 13, with perforate material holding bottoms 14, are carried on the conveyor belt 10.

Beneath the belt 10 within the chamber 12 there is provided a perforated plate 18 at a distance therebelow to spread the gas evenly to the boxes 13 as supplied from a main supply duct 21 by means of fan 25.

In FIG. 9 an up-down-draft arrangement is shown in which gas return ducts 20 between the up-flow ducts 15 cause dropping of material after each lifting or levitating action by the up-flow ducts 15. Gas supply ducts 15 have preforated outlet plates 17, with perforated plates 18' at a distance therebelow to spread the gas evenly to the plates 17. For some materials and some treatments an alternating up-down flow action is desirable.

Material to be treated is supplied to the baskets 13 by a feed chute or hopper 22 and material is discharged to a delivery chute 23. Instead, if desired, filled baskets may be put on the conveyor belt at the inlet end of the enclosure, as by hand or automatic handling means, and removed at the outlet end in a similar manner. The entrance opening 12a and the outlet opening 12b of the housing are arranged for minimum gas leakage here.

Supposing heated air to be used for treating the material, it may be forced through by a circulating fan 25 and have its temperature controlled by a heat exchange unit 26. A supplemental or alternate heater, such as a gas burner, is indicated at 30. All or part of the gas may be discharged through an exhaust duct 27 and fresh gas may be drawn in at a supply inlet 28. As here shown, the greater part of the gas is recirculated from the chamber above the baskets back to the main supply duct 21, being reconditioned before being returned to the material.

A thin flexible screen belt 32 closely overlies the tops of the baskets while traveling through the treating chamber, the screen belt being mounted on supporting pulleys 33 and moved by any suitable means to travel with the baskets, contact with the baskets being one suitable way of providing this movement of the screen belt. In some applications this screen belt may not be required.

According to the present invention the baskets 13 are straight at the bottom and flared at the top to cause material to be more completely fluidized or levitated at the bottom and dropped out of suspension as it nears the top because of the fact that the basket shape maintains a high gas velocity for a distance above the bottom and allows the velocity to decrease thereabove in the flared portion.

The baskets fit closely together to minimize gas flow at points other than through the baskets.

In the first form, shown in FIGS. 1–5, the baskets 13 have straight bottom wall portions 13a and flared top wall portions 13b at the ends of the basket. The sidewalls 13c (fore and aft) are straight for the full height of the basket.

In the embodiment shown in FIGS. 6 and 7 the baskets 13.1 have straight bottom wall portions 13.1a and flared top side (fore and aft) top wall portions 13.1b. The end walls 13.1c are straight for the full height of the basket.

In the embodiment shown in FIG. 8 the baskets 13.2 have straight bottom wall portions 13.2a and flared top wall portions 13.2b at both the ends and sides.

In operation, a relatively thin layer of fluent particulate solid material is carried on the perforate bottoms of the compartments (baskets) travelling through the treating chamber. The layer can be heavier with the present baskets than with fully flared baskets because the high velocity maintained near the bottom will keep more material in suspension. Yet the flared upper portion of the baskets causes the gas to lose velocity and drop the material back toward the bottom of the baskets. Gas from the main supply duct 21 is forced upward through the perforate bottoms of the baskets with sufficient velocity to levitate and spread apart the particles so as to expose all sides fully to the conditioned gas. By keeping the material confined to separate baskets by compartmentization, by dropping out of suspension, and/or by retention by the screen 32, all basket batches which travel through the chamber are given equal treatment, there being no chance for material of different treatment stages to mix.

It is thus seen that the invention provides improved apparatus for treating particulate materials in fluidized beds.

While certain embodiments of the invention have been disclsoed for purposes of illustration, it is to be understood that there may be various other embodiments within the general scope of the invention.

I claim:

1. Apparatus for treating fluent solid material in a fluidized bed, comprising in combination, a treating enclosure, means for supporting and moving material holding means through said enclosure, material holding means including a plurality of separate compartment forming walls and perforate bottoms for the compartments, and a supply duct beneath said supporting means for supplying a conditioned gaseous medium upwardly through the compartments to fluidize the material therein, the walls of said compartments having straight parallel portions extending for a distance upward above the bottom to hold the upflowing gaseous medium at constant velocity and being flared above the parallel portions to cause the velocity of the upflowing gaseous medium to be reduced to drop material back out of suspension.

2. Apparatus as set forth in claim 1, in which the compartment end walls have straight and flared portions, and in which the fore and aft walls, in the direction of compartment travel, are straight and parallel for the full height of the compartment.

3. Apparatus as set forth in claim 1, in which the fore and aft walls of the compartment have straight and flared portions, and in which the end walls are straight and parallel for the full height of the compartment.

4. Apparatus as set forth in claim 1, in which all side walls of a compartment have straight and flared portions.

5. Apparatus as set forth in claim 1, which further includes a thin flexible material retaining sheet screen fitting over the tops of the compartments to prevent material leaving with the ascending gaseous medium.

6. Apparatus for treating fluent solid material in a fluidized bed, comprising in combination, a treating enclosure, means for supporting and moving material holding means through said enclosure, material holding means including a plurality of separate compartment forming walls and perforate bottoms for the compartments, and spaced ducts beneath supporting means providing alternate upflow of a conditioned gaseous medium through said compartments and downflow through intermediate compartments, the walls of said compartments having straight parallel portions extending for a distance upward above the bottom to hold the upflowing gaseous medium at constant velocity and being flared above the parallel portions to cause the velocity of the upflowing gaseous medium to be reduced to drop material back out of suspension.

7. Apparatus as set forth in claim 6, in which the compartments are formed as boxes carried by an endless conveyor.

8. Apparatus as set forth in claim 6, which further includes a thin flexible retaining sheet screen fitting upon the tops of said boxes and travelling therewith through said enclosure above said ducts for upflowing and downflowing gaseous medium.

References Cited by the Examiner

UNITED STATES PATENTS

| | | | |
|---|---|---|---|
| 2,044,744 | 6/1936 | Hansen | 34—10 |
| 3,191,757 | 6/1965 | Parkes et al. | 34—217 X |
| 3,214,844 | 11/1965 | Oates et al. | 34—10 |

KENNETH W. SPRAGUE, *Primary Examiner.*